March 30, 1937.  H. C. ROBINSON  2,075,660
STOCK QUOTATION SYSTEM
Filed Nov. 2, 1932  8 Sheets-Sheet 6

INVENTOR—
HAROLD C. ROBINSON
ATTY.

INVENTOR—
HAROLD C. ROBINSON

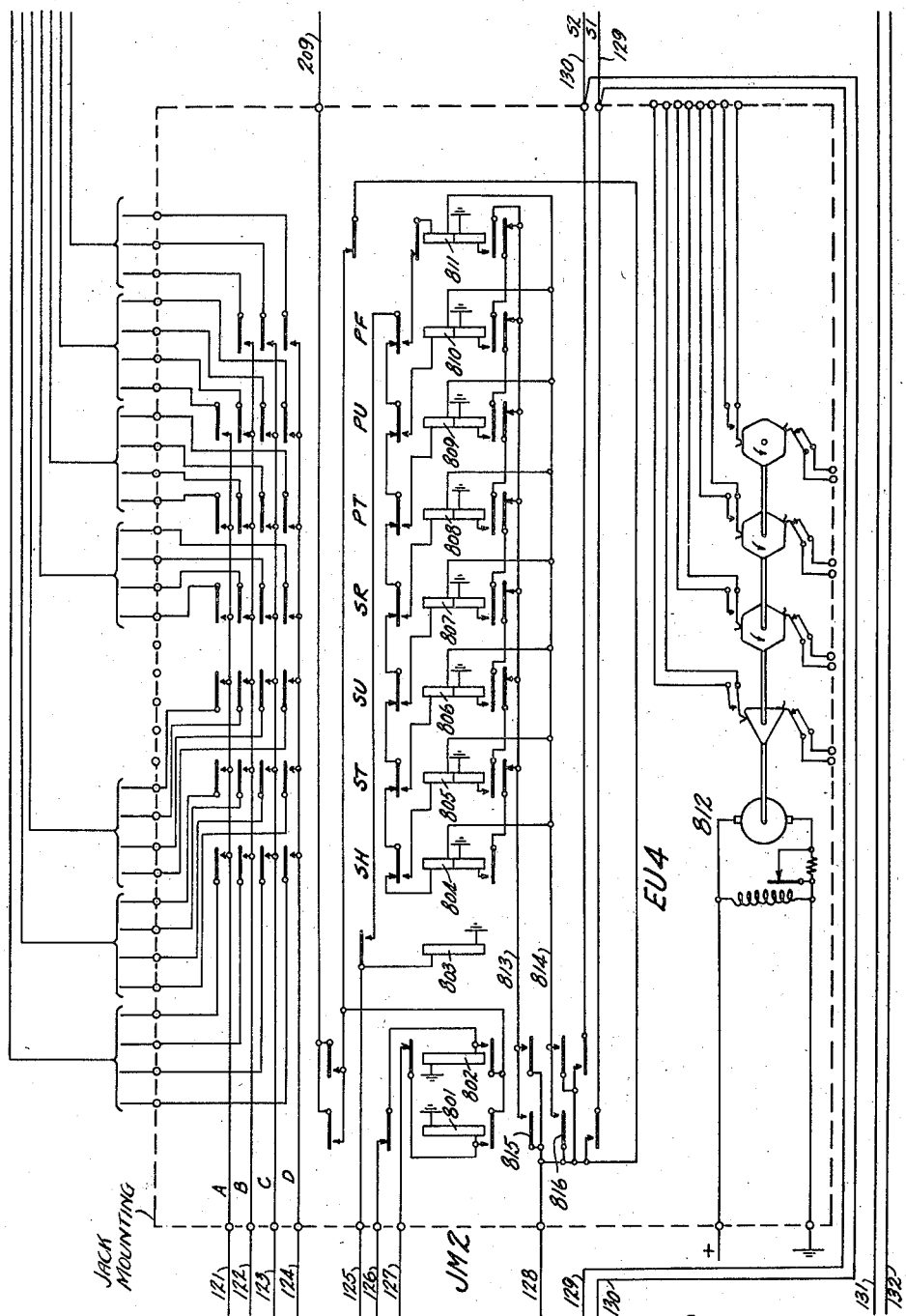

Patented Mar. 30, 1937

2,075,660

UNITED STATES PATENT OFFICE 2,075,660

STOCK QUOTATION SYSTEM

Harold C. Robinson, Chicago, Ill., assignor to Associated Electric Laboratories, Inc., Chicago, Ill., a corporation of Delaware Application November 2, 1932, Serial No. 640,812

16 Claims. (Cl. 177—353)

The present invention relates to stock-quotation systems, but it concerned more particularly with receivers used to receive transmitted stock quotations and display them on suitable indicators.

One object of the invention is the production of a new and improved receiver adaptable to receive stock quotations over one-wire lines and also over four-wire lines, interchangeable equipment being provided to permit it to operate over either line.

Another object has to do with the production of a receiver especially adapted to perform an abbreviated service in that it responds to and posts only the last price of stock quotations, whereas the receivers ordinarily employed post the previous close, the open, the high, the low, and the last price.

General description

In the Robinson et al. divisional application, 631,906, September 6, 1932, now Patent 2,049,627, granted August 4, 1936, a four-wire receiver (one which receives stock quotations over a four-wire line) is disclosed, while in the application of Robinson, 562,320, September 11, 1931, the four-wire receiver is modified to operate over a one-wire line. Now, the receivers in the two applications mentioned are highly specialized so that neither is capable of operation over a line of the type over which the other receiver operates. It will be at once apparent that it is desirable that a receiver be universal so that it can be used with either type of line, as this reduces the number of receivers that need to be carried in stock to meet the varying demand.

Referring now to the accompanying drawings comprising Figs. 1 to 8, they show by means of the usual circuit diagrams a sufficient amount of equipment in a stock-quotation receiver embodying the features of the invention to enable the invention to be understood.

Figs. 1 to 6 (of which Figs. 1 to 5 should be placed in successive order, with Fig. 6 under Fig. 4) show the receiver equipped for one-wire operation over the one-wire line OWL, Fig. 1. When Figs. 7 and 8 are substituted for Figs. 1 and 2, respectively, the receiver is adapted for four-wire operation over the four-wire line FWL, Fig. 7.

Referring now particularly to Figs. 1 to 6, the equipment unit EU1, Fig. 1, includes the receiving line relay 101, together with motor-control relays 102–106 and the sequence-control relays 107–110, while the equipment unit EU2, Fig. 2, includes the receiving distributor 200, together with the driving motor and controlling apparatus 201–204 and the impulsing cams 205–208, driven by the driving motor of the distributor 200.

Figs. 3 and 4 show the registers SH, ST, and SU, which register the stock-hundreds, stock-tens, and stock-units digits; the register SR, which registers the stock-range digit; and the registers PT, PU, and PF, which register the price-tens, price-units, and price-fractions digits. These registers are operated through the segments in ring 221 of the distributor 200.

Figure 6:
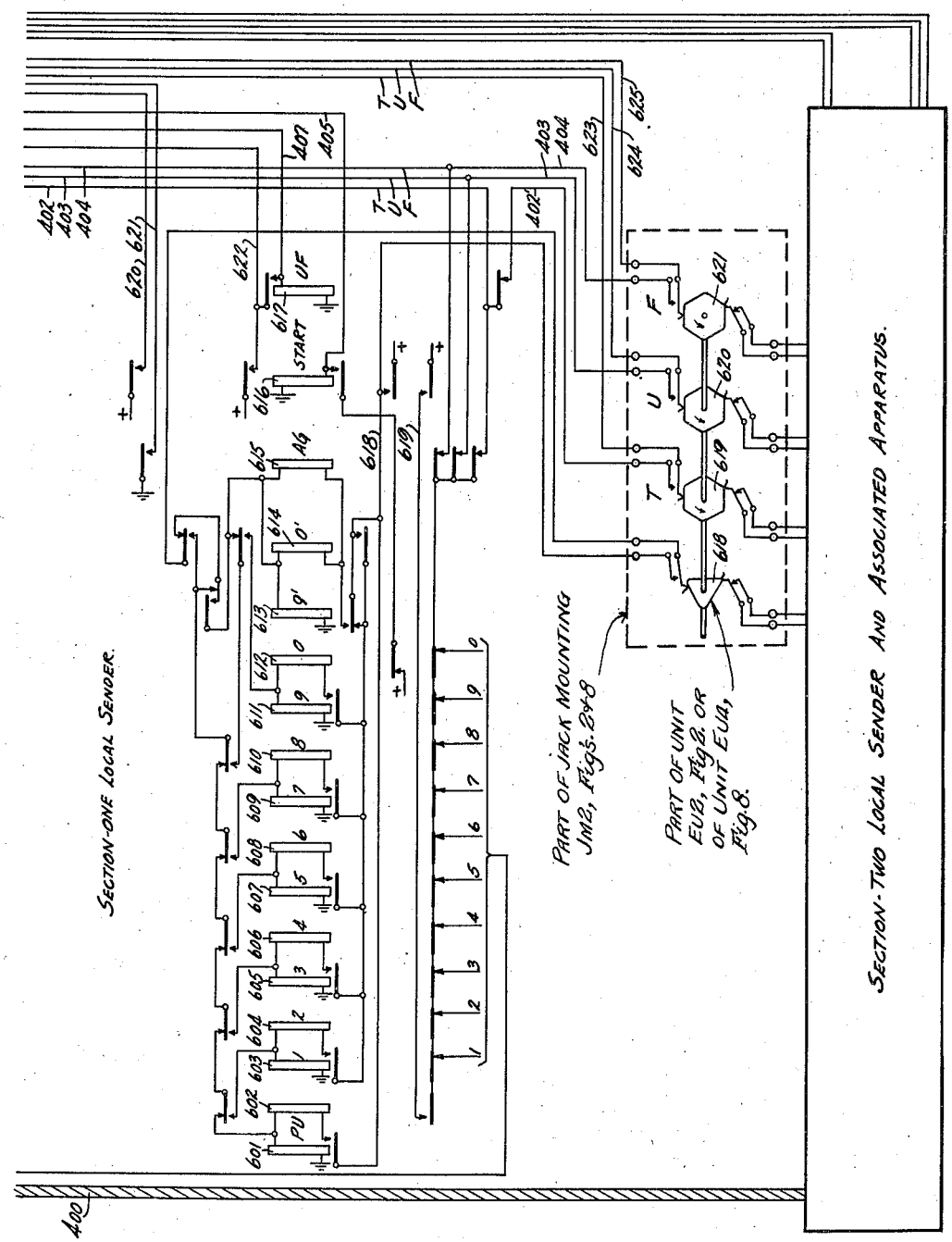
Fig. 6 shows one of the two local senders used to send impulses to effect the desired positioning of the indicators on the indicator board IB, Fig. 5.

As explained in the Robinson et al. patent hereinbefore referred to, the stocks whose quotations are handled by the system are divided into two groups, and the receiver is similarly divided into two sections, each section corresponding to a group of stocks. The sections are indicated section 1 and section 2. The registers PT, PU, and PF, Fig. 4, together with the local sender shown in detail in Fig. 6, are specific to section 1, while the similar equipment for section 2 is indicated by the rectangle at the bottom of Fig. 6. The cable 400 carries the necessary conductors to the second section. Also, the two terminal blocks 511 and 512, together with the associated connecting relays 501 and 502, are specific to the two sections, respectively. It may be pointed out that the division of stocks into two groups and the provision of two sections in the receiver enables the interconnecting line to be utilized more fully, as a quotation specific to one section may be received and stored while the local sender specific to the other section is disposing of a stock quotation previously received.

Figure 1:
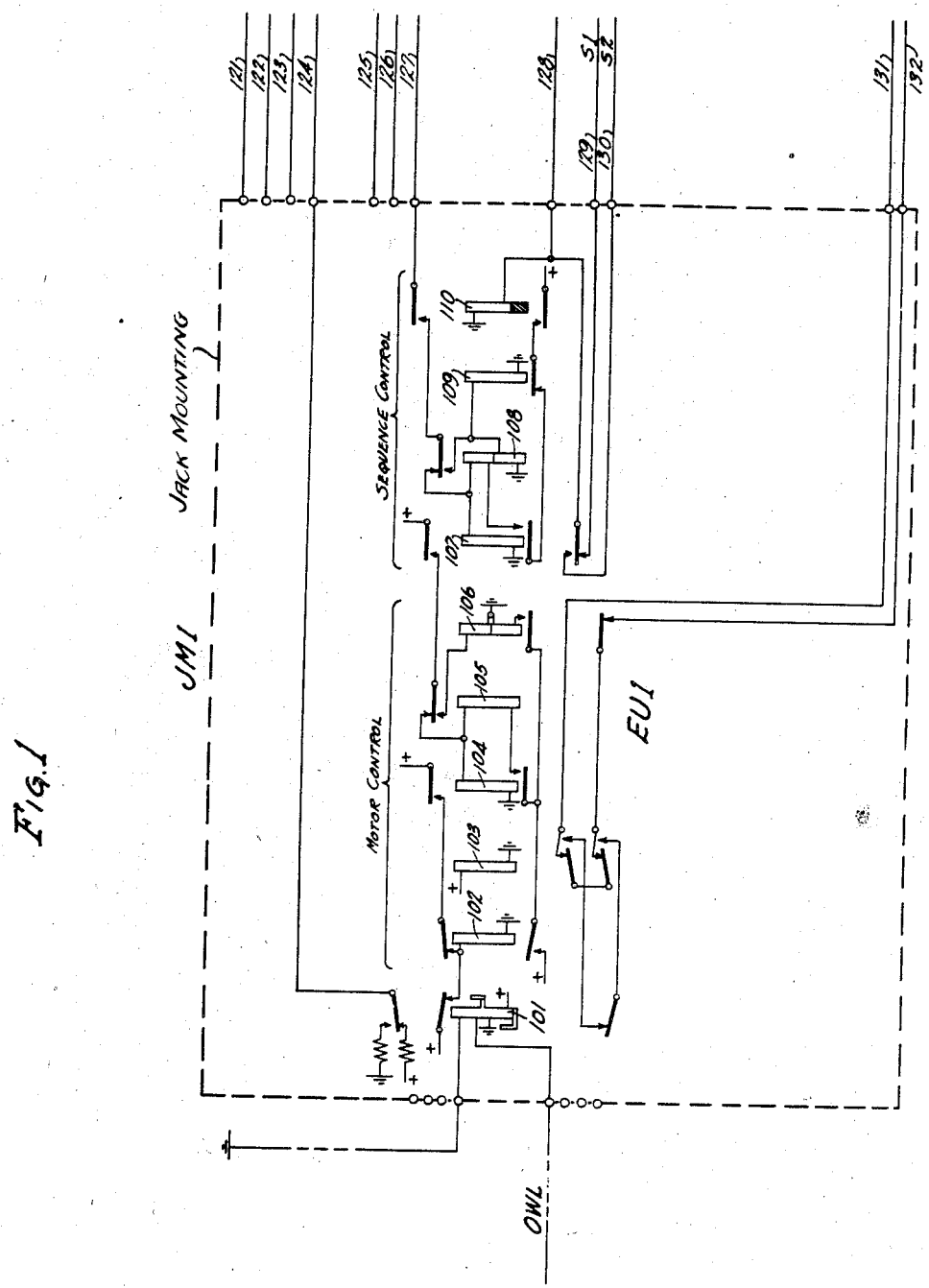
Figure 2:
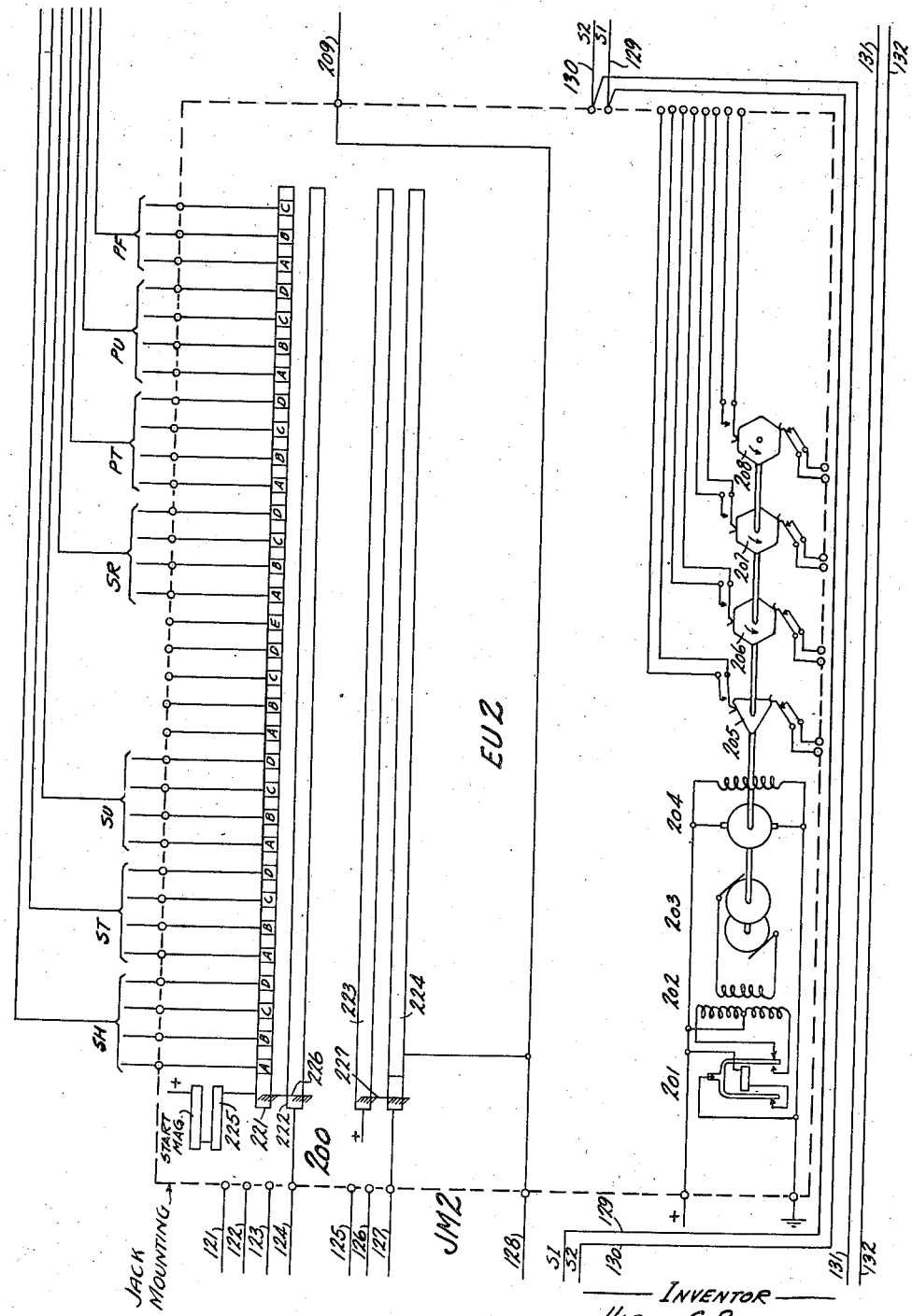

It is to be noted that a dotted rectangle JM1 is disclosed in Fig. 1, while a dotted rectangle JM2 is disclosed in Fig. 2, and that conductor terminals are indicated at various points in the dotted lines forming these rectangles. These rectangles, together with the indicated terminals, indicate a jack-mounting for an equipment unit. The equipment unit EU1, Fig. 1, for example, may be removed and replaced by the equipment unit EU3, Fig. 7, the jack mounting JM1, Fig. 7, being the same jack mounting indicated in Fig. 1.

Similarly, the equipment unit EU2, Fig. 2, may be lifted out of the jack mounting JM2 and replaced by the equipment unit EU4, Fig. 8, the jack mounting JM2 shown in Fig. 8 being the same one indicated in Fig. 2. The jack connections, indicated by the terminals located at points in the dotted lines forming the rectangles may be similar to the jack connections by means of which switches used in automatic telephone practice may be removed and replaced as desired without the necessity of removing and reconnecting the concerned wires.

In order to avoid the necessity of the provision of an additional motor for driving the interrupters or impulse generators associated with the local senders, the shaft of the driving motor of the distributor 200 is provided with cams 205, 206, 207, and 208 and associated impulse contacts. The fixed jack terminals associated with the impulse springs are suitably wired up to the local senders, as will be later explained.

When the receiver is being used in connection with a four-wire line, and the equipment unit EU2, Fig. 2, is replaced by the equipment unit EU4, Fig. 8, cams similar to the cams 205–208 are driven by a governor-controlled motor, and the corresponding impulse springs, of course, make connections through the same jack contacts of the jack mounting JM2 with the local senders.

Upon reference to the local senders, Fig. 6, it is to be noted that a motor shaft is shown in Fig. 6 carrying cams 618 to 621, which cams are indicated as operating impulse springs for sending impulses to the local senders. This showing in Fig. 6 has been made for the purpose of illustration only, and it is to be understood that the concerned conductors are wired to the contacts of jack mounting JM2, Figs. 2 and 8, and that the cams 618 to 621 and associated impulse springs are merely representative of the cams of equipment-unit EU2, Fig. 2, or of equipment-unit EU4, Fig. 8.

Figure 3:
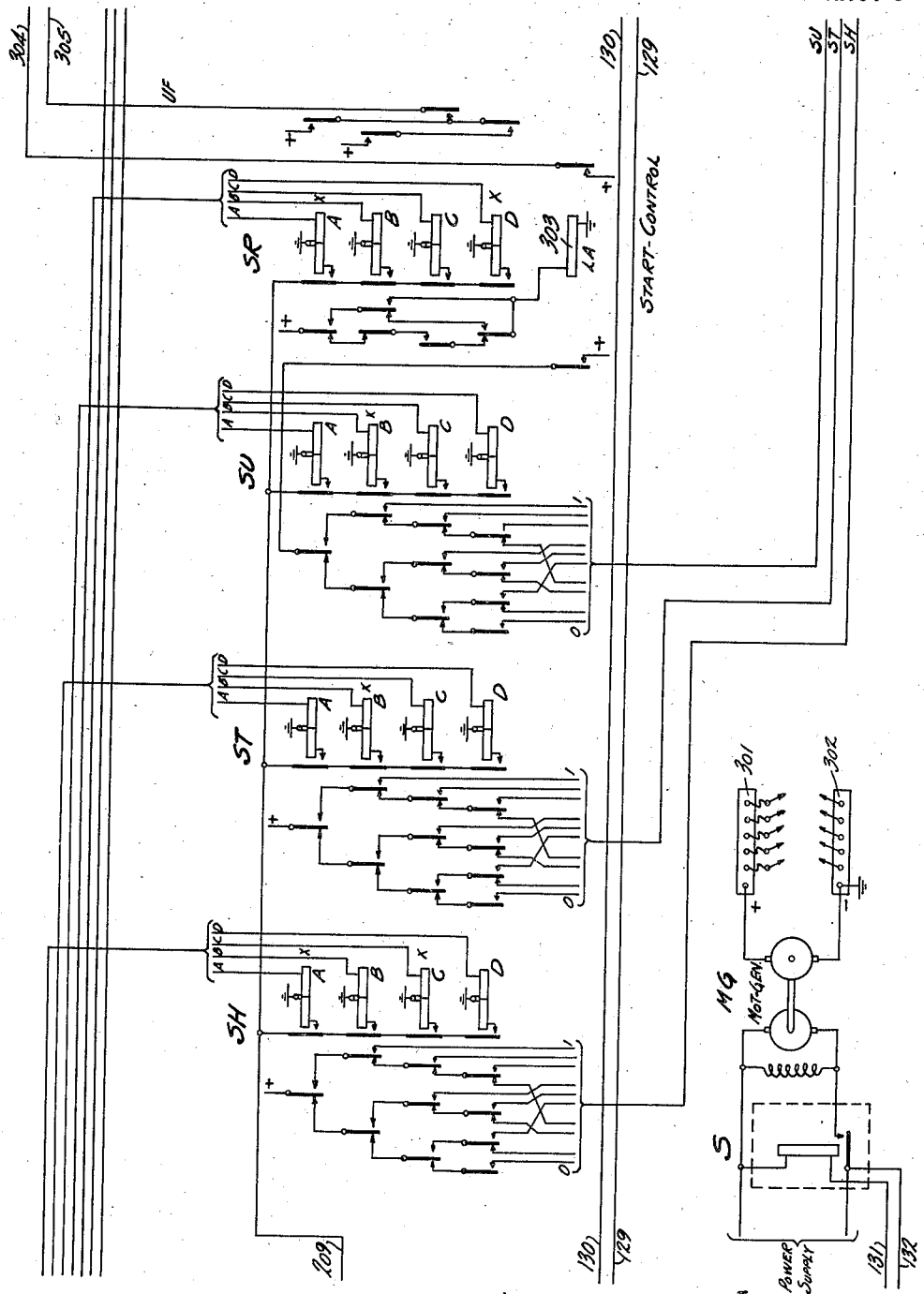

The motor generator MG, shown in Fig. 3, is controlled over conductors 131 and 132 in a manner similar to that disclosed in the applications referred to hereinbefore and as will be pointed out hereinafter.

Detailed description

The system having been described generally, a detailed description of the operation of the apparatus shown will now be given. For this purpose it will be assumed first that the receiver is adapted for one-wire operation as shown in Figs. 1 to 6, and the operation of the receiver responsive to quotations of the different characters will be explained.

One-wire operation

It is to be noted that the electro-polarized line relay 101, together with relays 102 and 103, is normally actuated. The normal actuation of the line relay 101 is brought about by the normal application of marking current to the one-wire line OWL at the controlling station. Relay 101 is the same type of electro-polarized relay employed as a line relay in the patent hereinbefore referred to. Relay 103, it may be mentioned, is maintaining a circuit closed for the starter S, Fig. 3, and the magnet of the starter S is maintaining the circuit closed to keep the motor generator MG in operation to supply operating current for the receiver through the bus-bars 301 and 302.

Figure 4:
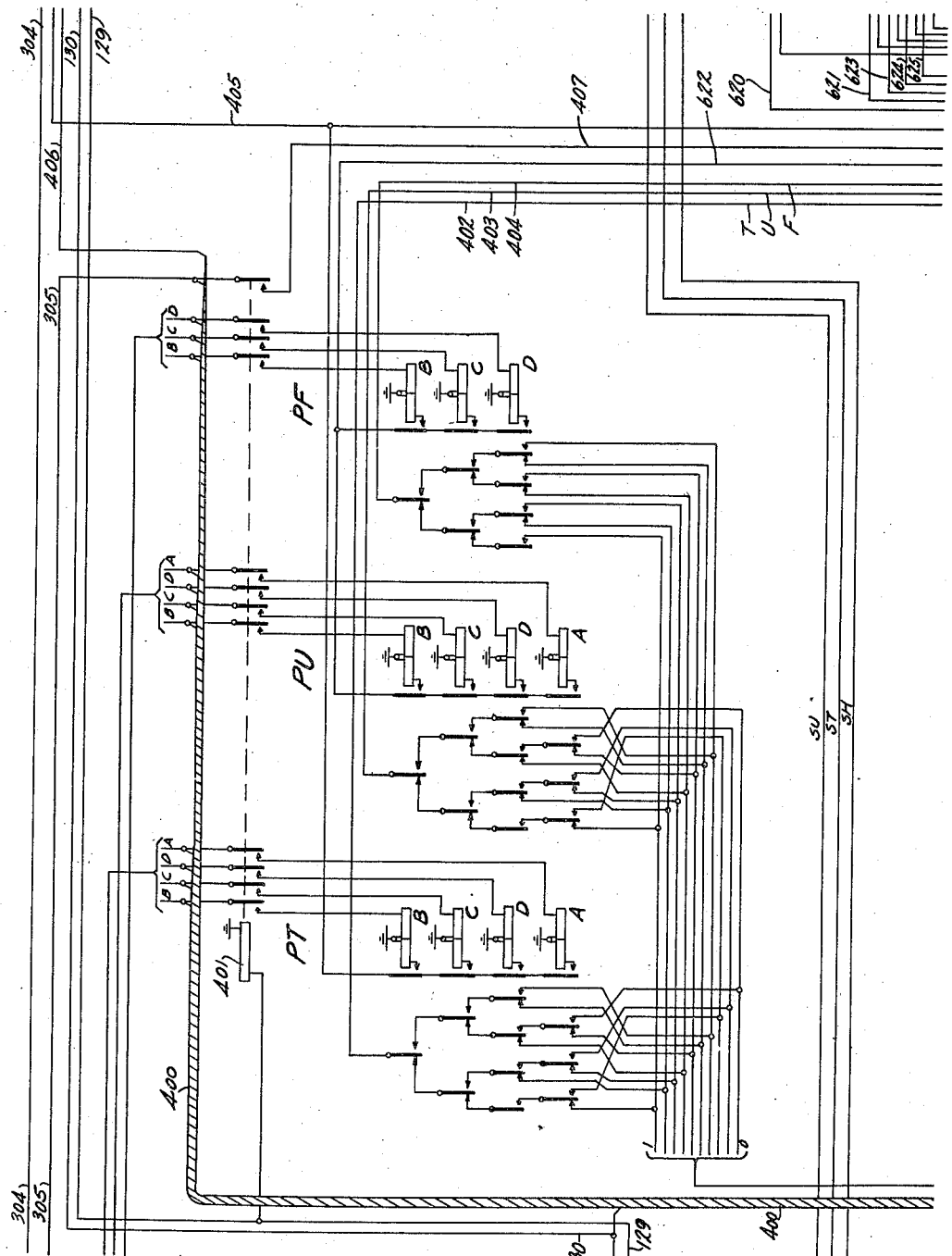
Figure 5:
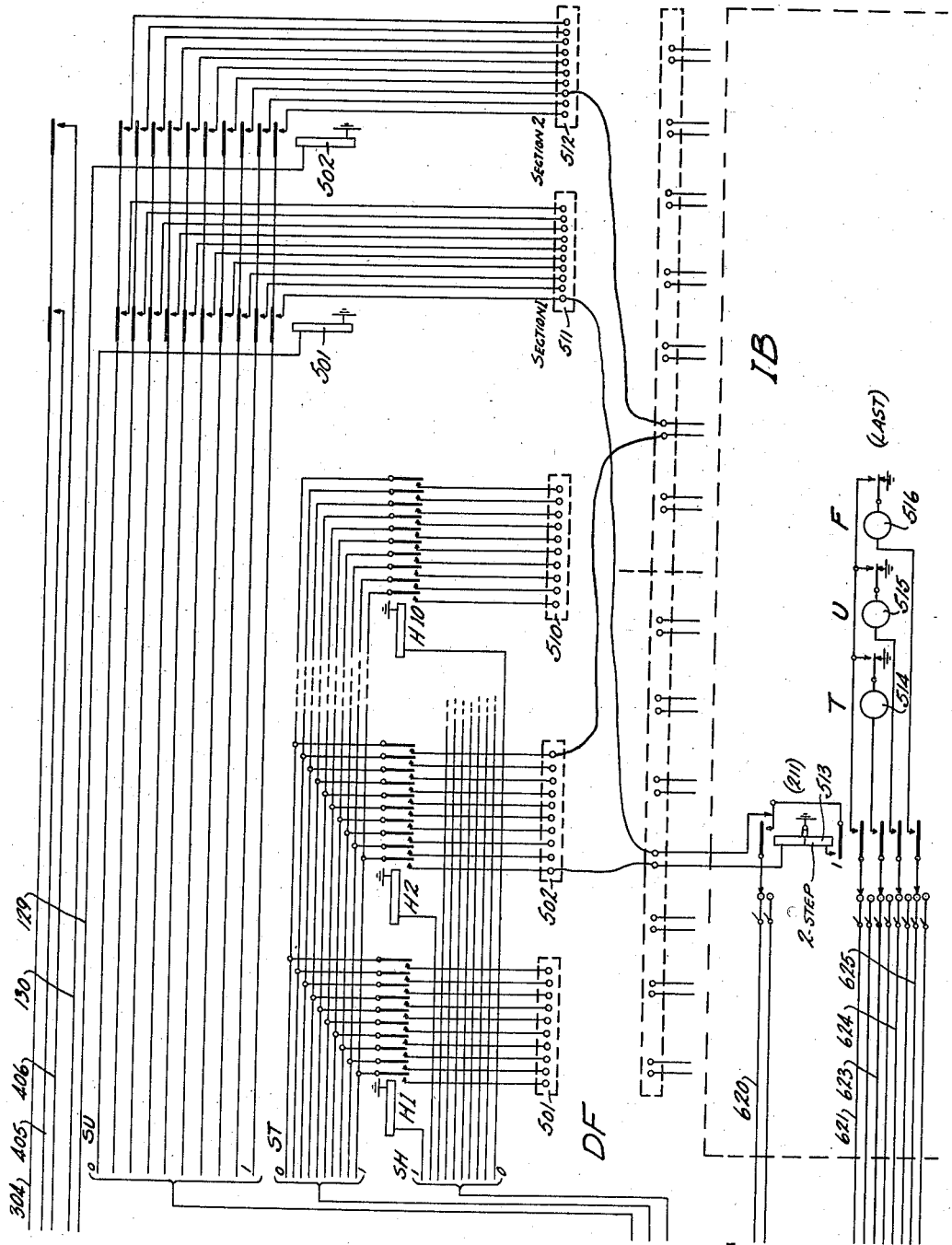
Fig. 5 shows the apparatus for selecting the group of indicators to be operated, together with the indicator board IB and a single indicator group for showing the last price only of a stock.

It will now be assumed that a quotation is received over line OWL concerning the last price of the stock represented by the indicators 514–516 at the indicator board IB, Fig. 5. In response to the start impulse (constituting a substitution of spacing current for marking current) the line relay 101 is restored, thereby closing a circuit over conductor 124 for the start magnet 225 of the distributor 200, whereupon the brushes 226 and 227 are released and permitted to pass over all the segments in the associated rings and return again to starting position. The line relay 101 is reoperated momentarily for each reapplication of marking current during the travel of the brushes, in each case sending a signal to actuate one of the register relays of Figs. 3 and 4. The register relays are connected to the indicated segments in the segmented ring 221, whereby they are operated when a positive potential is applied by way of conductor 124 and brush 226 to the concerned segments of ring 221. Brush 227, in co-operation with the energized solid ring 223 and the divided ring 224, applies holding current by way of conductor 209 to maintain the relays in registers SH, ST, SU, and SR, Fig. 3.

In one-wire operation, the first quotation transmitted to a receiver following an interval of non-transmission always pertains to section 1, while the following quotations pertain to the two sections alternately. The sequence-control relays in equipment unit EU1, Fig. 1, function to control the association of the two sections according to the above arrangement. Under the assumption that the instant quotation is received following a quiet period, the sequence-control relays are in normal condition and the energization of locking conductor 128 responsive to the movement of brush 227 of the distributor over the off-normal portion of ring 224 results in the energization of the slow-acting control relay 110 and in the extension of an energizing potential by way of contacts on relay 107 to the section-1 selecting conductor 129. Relays 401 and 501 are energized over conductor 129 to associate the common portion of the receiver with the individual section 1.

Assuming that the stock digits received are 2, 1, and 1, relays A and C in the register SH, Fig. 3, are operated; relay B in the register ST is operated, and relay B in the register SU is operated.

Assuming that the price being received is the last price, (as distinct from high last, low last, etc.), and that the price is being received in tens, units, and fractions, relays A and D in the stock-range register SR are operated. Accordingly, conductors 2, 1, and 1 associated with the registers SH, ST, and SU are selected, while the start-control relay 303 associated with the stock-range register SR is operated through contacts of the energized relays A and D by way of contacts of the non-energized relay B. Since the price is registered in tens, units, and fractions, relay C in the stock-range register SR is not operated, and the price-range conductor 305 remains disconnected.

When relay 303 operates, it completes the energization of the selected stock units conductor at its left-hand armature, while at its right-hand armature it energizes conductor 304, closing a circuit by way of contacts of the energized section-1 relay 501, and conductor 405 for the start relay 616 of the section-1 local sender, Fig. 6. A branch of conductor 405 extends to the price-tens register PT to afford locking current for the relays thereof.

With relay 401 energized over the section-1 conductor 129, the impulses representing the price digits are received on the section-1 registers PT, PU, and PF, Fig. 4, the operated ones of the relays becoming locked over conductor 405 and conductor 622 (energized by start relay 616).

Selecting the stock

With the second conductor energized in stock-hundreds group SH, the hundreds selecting relay H2, Fig. 5, is energized, connecting the conductors in the stock-tens group ST to the terminal block 502. With the first conductor in the stock-tens group ST energized, a circuit is now closed through contacts of relay H2 and a jumper on the distributing frame DF for the upper winding of the two-step stock relay 513. The upper winding of relay 513 is intentionally made inefficient so that it energizes the relay only sufficiently to close its inner lower contacts, whereby the complete energization of the relay and the consequent operation of the remaining ones of its contact springs is dependent upon the completion of a circuit for the lower winding of the relay.

With the first conductor in the stock-units group S2 energized, a circuit is closed through contacts of the section-1 relay 501, a terminal in the section-1 block 511, a jumper on the distributing frame DF, and contacts of relay 513, for the lower winding of relay 513. Upon the energization of its lower winding, relay 513 is fully energized and operates all its remaining contacts. At its upper armature, relay 513 locks itself to conductor 620 (energized by the upper armature of start relay 616), while at its lower armatures it connects up the indicators 514, 515, and 516 preparatory to their operation to display the tens, units, and fractions digits of the new quotation.

Posting the new quotation

The way in which the new quotation is posted responsive to the action of the section-1 local sender, Fig. 6, will now be pointed out. When start relay 616 is operated over conductor 405 as above pointed out (responsive to the action of the start control relay 303 associated with the stock-range register SR), conductors 618, 619, 620, and 622 are energized by the contacts of relay 616, and relay 616 closes a locking circuit for itself at its inner lower armature by way of the inner lower armature of the "O" counting relay 612 of the local sender.

With conductor 618 energized, a pick-up circuit exists through the upper contacts controlled by cam 618 (keeping in mind that the cams 618 to 621 are merely a reproduced showing of the corresponding cams in equipment units EU2 and EU4, Figs. 2 and 8) and contacts of relays 614, 613, 610, 608, 606, 604, and 602, for pick-up relay 601. Relay 601 operates and locks itself to conductor 618 in series with relay 602, so that relay 602 energizes in series with relay 601 as soon as the cam 618 opens the associated spring contacts. When relay 602 operates, it transfers the relay-operating circuit to the relays 603 and 604 at its upper contacts, while at its lower contacts it connects the energized conductor 619 through the three lower armatures of the actuating-ground relay 615 to the tens, units, and fractions conductors 402', 403, and 404. With these conductors now energized, impulsing circuits are closed through the contacts of cams 619 and 621 and over conductors 623-625 for the magnets of indicators 514-516, by way of contacts of stock relay 513. The impulse return path for the magnets of the registers is to ground by way of the lower contacts of the indicated off-normal springs. As soon as a register has reached its normal position, its cam-controlled off-normal spring is moved into engagement with its upper contacts, thereby opening the restoring circuit and preparing the resetting circuit.

As is explained more in detail in the Robinson et al. patent mentioned hereinbefore, the delivery of the restoring impulses to the selected indicators is accompanied by the successive operation of relays 603 to 610 and 613 and 614, and relays 603 to 610 are restored responsive to the actuation of relays 613 and 614 so that they may be reoperated immediately to count the resetting impulses. The actuating-ground relay 615 is operated in multiple with counting relay 614. At its three lower armatures it disconnects the energized conductor 619 from the tens, units, and fractions conductors 402', 403, and 404, while at its upper armature it energizes the actuating-ground conductor 621, thereby completing a return path for the first restoring impulse through contacts of stock relay 513 and the upper off-normal contacts of the registers 514-516.

The continued application of potential to the conductors 402', 403, and 404 now depends upon the connections that are made through the contacts of relays 603 to 612 to the digit conductors 1 to 0, multipled to the contact pyramids associated with the registers PT, PU, and PF, conductors 402, 403, and 404 being connected to the apexes of the contact pyramids.

Following the actuation of relay 615, relays 603 to 610 are reoperated, and relays 611 and 612 are operated, each of the said relays disconnecting a separate one of the digit conductors, whereby they are all progressively disconnected from the energized conductor 619. In this way, the value of the resetting digits delivered to the indicators 514, 515, and 516 is controlled in accordance with the setting of the registers PT, PU, and PF, Fig. 4, as explained more fully in the prior applications above mentioned.

When relay 612 operates following the interval allotted to the tenth resetting impulse, the locking circuit of start relay 616 is opened, whereupon relay 616 restores (conductor 405 having been deenergized responsive to the clearing-out of the stock-range register SR, as will be subsequently mentioned more fully). Upon the deenergization of start relay 616, conductors 618, 619, 620, and 622 are deenergized at the contacts of relay 616, terminating the action of the local sender; unlocking stock relay 513; and releasing the registers PT, PU, and PF, Fig. 4.

Receiving subsequent quotations

As soon as the distributor 200 has completed one revolution and the wipers 226 and 227 have come again into their normal position (in which position the wiper movement is stopped in the usual manner by the usual mechanism associated with the start magnet), locking conductor 209 is deenergized, permitting the relays in registers SH, ST, SU, and SR, Fig. 3, to restore. This restoration, of course, comes subsequent to the stock selection and does not cause any harmful result as the operated stock relay (513 in the example chosen) has already operated and become locked to conductor 620. The registers of Fig. 3 are therefore immediately available for use in handling a quotation pertaining to the other stock group while section 1 of the receiver in the manner hereinbefore pointed out is disposing of the quotation previously received.

As a further result of brush 227 arriving in its normal position, energizing potential is removed from conductor 128 leading to the sequence-control group, thereby opening the circuit of relay 110 and removing ground potential from the section-1 conductor 129. The section-1 connecting relays, 401, and 501, Figs. 4 and 5, now restore to disassociate the section-1 portion of the receiver from the common receiving apparatus. The slow-acting relay 110, however, does not restore at this time in case another quotation is received promptly.

With relay 110 in operated condition, and with brush 227 in normal position, the energizing potential placed on conductor 127 by brush 227 from the solid ring 223 is extended through contacts of the energized relay 110 to relay 107. Relay 107 is operated to disconnect conductor 128 from the section-1 conductor 129 and connect it to the corresponding conductor 130 associated with section 2. Relay 107 also locks itself in series with the upper winding of relay 108 through the lower contacts of relays 109 and 110, so that relay 108 operates when the distributor starts to move responsive to the following quotation. Relay 108 prepares a circuit for release relay 109. As soon as the next rotation of the distributor 200 has been completed and the brushes are again in normal position, the consequent energization of conductor 127 by brush 227 results in the closure of a circuit through contacts of operated relays 109 and 108 for the lower winding of relay 108 and release relay 109 in parallel. Relay 108 is maintained energized and relay 109 is energized to open the locking circuit of relay 107. Relay 107 is immediately deenergized to substitute the section-1 conductor 129 for the section-2 conductor 130. Relays 108 and 109 both restore when the distributor again starts.

In case the distributor 200 remains in its normal position for more than a moment, slow-acting relay 110 restores and clears out the relays 107 and 109, whatever their condition, so that the next received quotation is directed to section 1 through the medium of the energization of the section-1 conductor 129.

When a quotation is received in units and fractions only, and the setting of the tens indicator is therefore not to be disturbed, relay C of the register SR, Fig. 3, is actuated to complete a circuit path for energizing conductor 305. Assuming section 1 to be connected up at this time, energizing potential is extended through contacts of relay 401 and conductor 407 to the units-fractions relay 617. Relay 617 locks itself to conductor 622 and disconnects the tens actuating conductor 402'.

*Receiving quotations other than current quotations*

As previously mentioned herein, the receiver is arranged to post only the last or current prices of stocks. When a quotation is received which is not a current quotation, the stock digits are registered on registers SH, ST, and SU, the range is set up on the range register SR, and the operated relays of these registers lock to conductor 209, all as previously described. No stock relay such as 513 is operated, however, because the setting of the range register SR under these circumstances is such that no circuit is completed for relay 303, and consequently, no potential is applied to the contacts of register SU. Also it may be pointed out that the failure of relay 303 to operate prevents the local sender, Fig. 6, from starting, and likewise prevents holding potential from being applied to the locking circuits for the relays of the price registers PT, PU, and PF. When the price digits are received at these registers, therefore, the operated relays immediately restore. The registers SH, ST, SU, and SR are restored when ground is removed from conductor 209 at the distributor 200.

*Motor control*

The stopping of the motor generator MG and the driving motor of the distributor 200 is controlled over the incoming line through the medium of the line relay. To effect the stopping of the motor generator, the line current is reversed from marking to spacing and permitted to remain that way while the distributor makes a number of uncontrolled revolutions. Line relay 101 restores when the current flow is reversed, starting the distributor over conductor 124 in the usual manner. Relay 102 restores responsive to the restoration of relay 101 and prepares locking circuits for relays 104 to 106 at its lower armature. Responsive to the rotation of the distributor 200, the sequence-control relays 107 to 110 operate in the hereinbefore-explained manner. The first time relay 107 operates it closes a circuit for relay 104, which relay locks itself in series with relay 105 through the contacts of the now-restored relay 102. This locking circuit, it will be understood, is ordinarily broken upon the reoperation of relay 102 responsive to the first marking impulse received during the rotation of the distributor. Under the present assumption, however, relay 101 does not reoperate and relay 102 remains restored. That being the case, when relay 107 restores, relay 105 operates in series with relay 104 and prepares a circuit for relay 106. Upon the next operation of relay 107 a circuit is closed for relay 106 at the upper armature of relay 107 through the upper armature of the operated relay 105. Relay 106 operates and locks itself through the lower contacts of relay 102, at the same time opening the circuit to the starter S over conductors 131 and 132. The starter S now opens the circuit of the motor generator MG, permitting the motor generator to come to rest.

When the motor generator has slowed down sufficiently to permit the potential across bus-bars 301 and 302 to be reduced somewhat, relay 103, which has a relatively stiff adjustment, restores and opens an additional point in the circuit of the starter (relay 101 being in restored position). The other relays depending upon the current from the motor generator restore upon a further reduction of the voltage across the bus-bars 301 and 302.

The tuning fork 201 and the motor 204 of the distributor both come to rest because they derive their current from the bus-bars 301 and 302.

In order to start the receiver into operation again, the marking current is restored over the line, whereupon line relay 101 again operates and closes a circuit for the starter S to bring the motor generator MG, Fig. 3, into operation. As soon as the motor generator starts, the distributor 200, Fig. 2, is started because of the appearance of the operating potential across bus-bars 301 and 302. Relay 103, Fig. 1, operates when the potential builds up across the bus-bars and cuts out the contacts of line relay 101 in the motor-control circuit.

Four-wire operation

Figure 7:
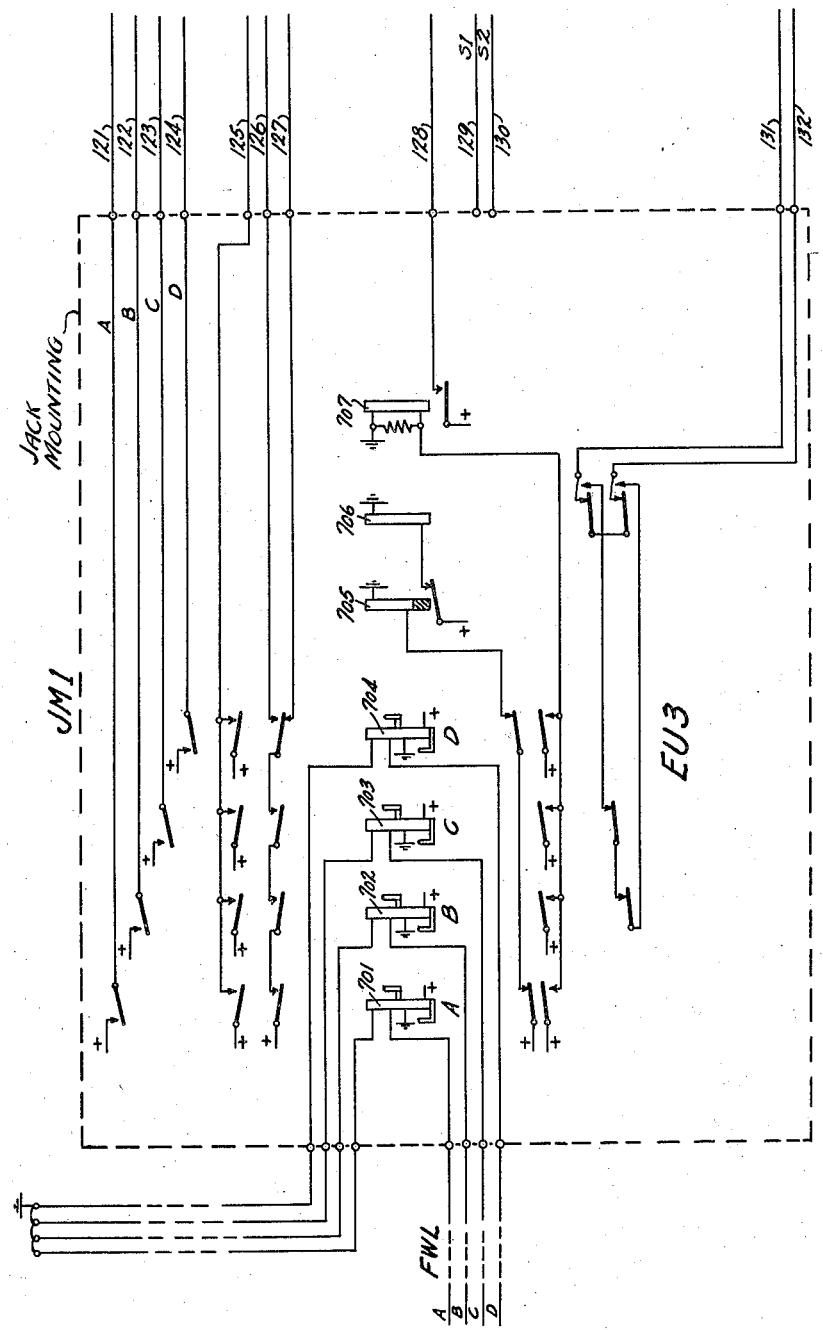

When the receiver is to be used in conjunction with a four-wire line, the one-wire line OWL, Fig. 1, is replaced by a four-wire line such as FWL, Fig. 7. In addition, the equipment units EU1 and EU2, Figs. 1 and 2, are removed from the jack mountings JM1 and JM2, Figs. 1 and 2 and 7 and 8, and are replaced by equipment units EU3 and EU4, Figs. 7 and 8. With the substitutions noted, the receiver is adapted for four-wire operation, as will now be pointed out:

In four-wire operation, all the code units of a quotation digit are received simultaneously, the four relays 701–704, Fig. 7, being provided for this purpose. The four line relays of Fig. 7 are each in a normally actuated position responsive to spacing current, and the slow-acting motor-control relay 705 is normally energized through contacts of the A and B line relays 701 and 704. Relay 706 is energized through contacts of control relay 705 and is maintaining the circuit closed over conductors 131 and 132 to the starter associated with the motor generator, Fig. 3.

Moreover, the governor-controlled motor 812 is normally in operation driving the cams which control the generation of impulses for the use of the local senders in restoring and resetting the indicators. It should be kept in mind that the cams associated with the motor 812, like the cams in Fig. 2, are shown again in Fig. 6 for the purpose of simplifying the showing of the wiring. As pointed out, it will be understood that the cams 618 to 621, Fig. 6, and the associated impulse springs do not represent equipment in addition to the equipment shown in Figs. 2 and 8, but are merely illustrative of whichever one of the two equipment units may be in use, and that the concerned conductors in Fig. 6 are actually connected to the lower right-hand group of terminals of jack mounting JM2, Figs. 2 and 8.

It will now be assumed that the digits of a stock quotation are successively received over the four-wire line FWL. For each digit, a combination of the relays 701 to 704 is momentarily deenergized. Upon the receipt of the first digit, the shunted slow-acting relay 707 operates and places a ground potential on the holding conductor 123, thereby preparing a locking circuit for the receiver selecting relays 801 and 802.

In four-wire operation, each stock quotation is prefaced by a digit for selecting one of the two sections of the receiver, which digit may or may not be considered a digit of the stock quotation. Assuming that the received quotation is one concerning section 1, the section-selecting digit includes a marking impulse over each of the channels A, B, and C. Upon the momentary deenergization of the A, B, and C line relays 701, 702, and 703, a circuit is closed at the inner upper contacts of relays 701 to 703 and over conductor 127 for the section-1 selecting relay 801. Relay 801 operates and at its inner lower armature it locks itself to the energized holding conductor 128 by way of the upper contacts of release relay 811. At its upper armature, relay 801 applies energizing potential from conductor 128 (by way of the upper contacts of relay 811) to the register locking conductor 209; at armature 815 relay 801 energizes the locking conductor 813 to prepare locking circuits for the counting relays 804–811; at armature 816 it energizes the operating conductor 814 to prepare operating circuits for the said counting relays; and at its lower armature it places an energizing potential on the section-1 selecting conductor 129 to energize the section-1 connecting relays 401 and 501 for the purpose hereinbefore set forth.

The distribution of the received group of impulses to the registers is made by relays 804–810, controlled by the priming relay 803. These relays are operated in what is commonly known as a counting chain and in a manner now to be pointed out.

Each time a combination of the receiving relays 701 to 704 is deenergized, priming relay 803 is operated over conductor 125. Accordingly, relay 803 is operated by relays 701 to 703 when the section-selecting digit is received. Upon operating, relay 803 at this time prepares a locking circuit for itself in series with the upper winding of relay 804, which locking circuit is completed over conductors 813 and 128 upon the operation of armature 816 of the section-selecting relay 801, before mentioned. Relay 804 energizes in series with relay 803 when the line relays are reoperated at the end of the current reversals constituting the digit. Upon operating, relay 804 locks its lower winding to conductor 813 at its lower armature, while at its upper armature it transfers the operating circuit to the upper winding of relay 805. Relay 803 restores while the operating circuit is being transferred.

The relays 805–811 are successively operated in circuit with relay 803 responsive to the impulse groups constituting the stock quotation. Each of the above-mentioned relays releases the preceding one of the relays 804 to 810 upon operation.

The conductors 121–124 are the ones over which the setting impulses are delivered to the registers. These conductors are associated successively with the registers SH, ST, SU, SR, PT, PU, and PF, Figs. 3 and 4, by the relays 804 to 810.

When relay 811 responds following the receipt of the price-fractions digit, it opens the locking circuit of relay 810 at its lower armature; locks itself to conductor 813 at its inner lower armature; opens its initial energizing circuit at its inner upper armature; and at its upper armature it opens the locking circuit of relay 801 and the holding circuit closed over conductor 209 for the registers of Fig. 3. Relay 801 restores at this point and disconnects the conductors 209, 813, 814, and 129. Relay 810 restores responsive to the opening of its locking circuit at the lower contacts of relay 811, immediately reclosing the operating chain circuit to relay 804 to prepare for the immediate receipt of the following stock quotation. Relay 811 is restored by the removal of locking potential from conductor 813 by relay 801.

When the next quotation is received (which is a quotation for section 2 if it is received immediately), relays 701—704 are momentarily deenergized to close a circuit for the section—2 selecting relay 802, whereupon relay 802 operates to select the second section of the receiver and to otherwise prepare the receiver for operation as explained in connection with relay 801.

It may be pointed out that the motor generator is shut down (when the four-wire modification is used) responsive to a prolonged deenergization of the receiving relays. Relay 705 deenergizes under this condition and opens the circuit of relay 706. When relay 706 restores, it opens the circuit over conductors 131 and 132 to the starter associated with the motor generator (relay 701 and 703 being restored).

When the receiver is to be again started into operation and the relays 701—704 are reoperated, relays 702 and 703 close the starter circuit through contacts of the restored relay 706. As soon as the motor generator has come into operation and built up sufficient operating voltage, relay 705 operates through contacts of relays 701 and 704 and reoperates relay 706 to cut relays 702 and 703 out of the starting circuit.

What is claimed is:

1. In a stock-quotation receiver comprising a common portion and two individual sections, section-selecting means and stock-selecting means included in said common portion, means controlled from a distance for actuating both of said selecting means, stock relays assigned to each section, means controlled by a portion of said stock-selecting means for partially actuating a stock relay of either section, and means controlled jointly by the remaining part of the stock-selecting apparatus and said section-selecting apparatus for completing the operation of the said partially operated stock relay.

2. In a stock-quotation system, a stock-quotation line over which current and previous stock quotations are transmitted, each quotation comprising a plurality of digits, a stock-quotation receiver operatively associated with said line to receive stock quotations thereover, said receiver including indicators for posting the current prices of stocks, registering means for registering the digits of stock quotations, sending means operative under the control of said registering means to send setting impulses to said indicators, and means operative under the control of said registering means for starting said sending means into operation only in case the quotation received is one concerning the current selling price of a stock.

3. In a stock quotation receiver, stock registers and price registers, means for selecting a stock under control of said stock registers, means for posting the price thereof under control of said price registers, means for interchangeably inserting in the receiver either of two receiving units adapted to receive stock and price digits over two kinds of lines, a line of one kind being one over which the signals in a signal group are received successively in coded time relationship, while a line of the other kind is one over which signals forming a signal group are received simultaneously over separate channels, and means for interchangeably inserting in said receiver either of two distributing units, corresponding, respectively, to said receiving units, for distributing the received digits to said registers.

4. In a stock quotation receiver, stock registering and selecting equipment common to all stocks to be quoted, price registers and posting equipment divided into two sections, stock selecting equipment individual to each section, a plurality of stock relays, also divided into two sections and each effective when operated to place an associated part of the posting equipment under the control of the price registers of the corresponding section, each stock relay requiring control over two circuits for its operation, and two control circuits for each relay, one circuit controlled through said common stock selecting equipment and the other controlled through said individual stock selecting equipment.

5. In a stock quotation receiver, three stock registers for registering the respective digits designating a stock, a set of digit conductors outgoing from each register, circuit connections at two of said registers whereby a potential is applied to selected digit conductors responsive to the operation of the registers, a stock range register, and circuit connections between the third of said stock registers and said stock range register whereby the application of a potential to a selected digit conductor outgoing from such third stock register is dependent upon the setting of said stock range register.

6. In a stock quotation receiver, a plurality of registers for registering, respectively, the characters designating a stock, a plurality of stock relays, a stock selector by means of which said registers cooperate to jointly select and operate a stock relay, a range register, and circuit arrangements preventing one of said registers from cooperating to operate a stock relay if a particular range is set up on said range register.

7. In a stock quotation receiver, a plurality of sets of conductors, a register selectively controlling the application of potential to the conductors in each set, stock relays, selecting circuits for the stock relays requiring the application of potential to one conductor of each set to operate a stock relay, a range register, and circuit arrangements such that no potential can be applied to any conductor of one of said sets by the associated register in case the said range register is given a particular predetermined setting.

8. In a stock quotation receiver in which the indicators for a certain range or ranges of quotations are omitted, stock registers, stock selecting equipment controlled by said stock registers, a range register, and means controlled by said range register whereby the selection of a stock responsive to the operation of the stock registers is made dependent upon the range register being set for a range as to which the quotation indicators are provided.

9. In a stock quotation receiver which includes stock and price registers and also a stock range register, one of said price registers comprising a group of relays, a local sender, a start relay for the sender, means for operating said start relay or not dependent on the value of the setting of said range register, and a locking circuit for said register relays controlled by said start relay.

10. In a stock quotation receiver which includes stock and price registers and also a stock range register, said price registers each comprising a plurality of relays, locking circuits for said relays, and means whereby the completion of said locking circuits is made dependent upon the value of the setting of said range register.

11. In combination; a stock quotation receiver including means for storing groups of signals corresponding to stock quotations and including means for controlling the posting of stock quotations according to the stored signals; a first supplementary receiving and distributing means effective to receive successive signal groups over a first line, the signals of each group in coded time relationship, and to distribute the received signals to the storing means; a second supplementary receiving and distributing means effective to receive successive signals over a second line, all the signals of a group simultaneously, and to distribute the received signals to the storing means; similarly disposed terminals on said first and second supplementary receiving and distributing means, and terminals on said receiver for cooperating interchangeably with the terminals of the said two supplementary means whereby either may be conveniently added to the receiver in lieu of the other to complete the receiver for operation from the available one of said two lines.

12. In combination, an incomplete stock quotation receiver including means for storing groups of signals corresponding to stock quotations and including means for controlling the posting of the stock quotations according to the stored signals, terminals on said receiver to which either an incoming one-wire or an incoming stock-quotation four-wire line may be secured, a first completing means for said receiver including a one-wire impulse distributor, a second completing means including a four-wire distributor composed of relays successively operable responsive to the receipt of quotation signals over the four-wire line, sufficient terminals on said incomplete receiver for cooperating with either of said completing means to form a complete stock quotation receiver, terminals on the first said completing means effective when the first completing means is mounted on the receiver for cooperating with corresponding ones of the terminals on the receiver to enable the one-wire distributor therein to receive signals over the one-wire line and distribute them through the cooperating terminals to the said storing means, and terminals on the second completing means for enabling such completing means, when mounted on the receiver, to receive signals over a connected four-wire line and distribute them through the cooperating terminals to the said storing means, whereby the said incomplete receiver may be readily transformed into a complete one-wire stock quotation receiver by the addition of the first-named completing means and readily transformed into a complete four-wire receiver by the alternative addition of the second of said completing means.

13. In a stock-quotation receiver comprising a common portion and two individual sections, section-selecting means and stock-selecting means included in said common portion and both controllable from a distance to perform their selecting functions, stock relays assigned to stocks of the first section, other stock relays assigned to stocks of the second section, means controlled by a portion of said stock-selecting means for partially actuating the relays assigned to one or more of the stocks without regard to section, and means controlled jointly by the remaining part of the stock-selecting means and said section-selecting means for completing the operation of a single one of the partially operated stock relays, in the event that one of the partially operated stock relays is assigned to the section selected and also corresponds to the desired stock to be selected.

14. In a stock quotation system, a stock quotation line over which current and previous stock quotations are transmitted, each stock quotation including an indication of whether it is a current quotation or a previous quotation, a stock quotation receiver operatively associated with said line to receive both current and previous stock quotations thereover, said receiver including indicators for posting only the current prices of stocks, registering means for registering the digits of stock quotations, sending means operable under the control of said registering means to send setting impulses to said receivers, and means operable under the control of said registering means for starting said sending means into operation only in case the quotation received is one concerning the current selling price of a stock.

15. In a stock quotation system, a stock quotation line over which current and previous stock quotations are transmitted, each stock quotation including a plurality of digits, each of which indicates whether the quotation is one concerning the current selling price of a stock or concerning a previous selling price of the stock, a stock quotation receiver operatively associated with said line to receive quotations thereover said receiver including indicators for posting the current prices of stocks, registering means for registering the digits of stock quotations, sending means operative under the control of said registering means to send setting impulses to said indicators, and means operative under the control of the part of said registering means which registers the digit indicative of whether or not the quotation received is one concerning the current selling price of a stock for starting said sending means into operation only in case the quotation received is one concerning the current selling price of the stock.

16. In a stock quotation receiver, means for receiving and registering stock quotations, said means including a range register capable of taking up any one of a number of range settings, each setting corresponding to a range digit of different value, the values of the range digits being indicative of the varying combinations of ranges of the stock quotations, a single-range indicator for each stock to be quoted, means for selecting a stock indicator under control of part of said quotation registering means, a local sender normally ready to actuate any selected indicator under control of an additional part of the said quotation registering means, and means responsive to only such settings of said range register as are indicative of the range to which the indicators at the receiver correspond for starting said sender.

HAROLD C. ROBINSON.